United States Patent
Smith et al.

(10) Patent No.: US 10,552,138 B2
(45) Date of Patent: Feb. 4, 2020

(54) TECHNOLOGIES FOR SECURE SOFTWARE UPDATE USING BUNDLES AND MERKLE SIGNATURES

(71) Applicant: Intel Corporation, Santa Clara, CA (US)

(72) Inventors: Ned M. Smith, Beaverton, OR (US); Igor Stoppa, Vantaa (FI); Timothy C. Pepper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/267,355

(22) Filed: Sep. 16, 2016

(65) Prior Publication Data
US 2017/0357496 A1 Dec. 14, 2017

Related U.S. Application Data

(60) Provisional application No. 62/349,077, filed on Jun. 12, 2016.

(51) Int. Cl.
*G06F 21/00* (2013.01)
*G06F 8/65* (2018.01)
(Continued)

(52) U.S. Cl.
CPC ............ *G06F 8/65* (2013.01); *G06F 16/2365* (2019.01); *H04L 9/0643* (2013.01); *H04L 9/14* (2013.01);
(Continued)

(58) Field of Classification Search
CPC ... G06F 8/65; G06F 17/30371; H04L 9/3247; H04L 9/3228; H04L 9/3239; H04L 9/14; H04L 9/0643; H04L 9/30
See application file for complete search history.

(56) References Cited

U.S. PATENT DOCUMENTS

| 8,850,281 B2 * | 9/2014 | Potkonjak ............. H04L 9/3247 714/52 |
| 10,033,534 B2 * | 7/2018 | Schulz .................... H04L 63/06 |

(Continued)

OTHER PUBLICATIONS

International search report for PCT application No. PCT/US2017/032423, dated Jul. 24, 2017 (3 pages).

(Continued)

*Primary Examiner* — John B King
(74) *Attorney, Agent, or Firm* — Barnes & Thornburg LLP

(57) ABSTRACT

Technologies for secure software update include an update server and one or more client computing devices. The update server generates a software release including release components, such as packages and/or bundles, and a version number. The update server generates an integrity hash tree over the software release and a Lamport one-time signature key pair for each node of the integrity hash tree. The update server generates a Merkle signature scheme authentication tree based on the key pairs and signs each node of the integrity hash tree. The update server signs the root of the authentication tree with an anchor private key. A client computing device downloads one or more release components and verifies the release components with the integrity hash tree, the signatures, and the authentication tree. The client computing device verifies the root of the authentication tree with an anchor public key. Other embodiments are described and claimed.

25 Claims, 6 Drawing Sheets

(51) Int. Cl.
  *G06F 16/23* (2019.01)
  *H04L 9/06* (2006.01)
  *H04L 9/14* (2006.01)
  *H04L 9/30* (2006.01)
  *H04L 9/32* (2006.01)

(52) U.S. Cl.
  CPC .............. *H04L 9/30* (2013.01); *H04L 9/3228* (2013.01); *H04L 9/3239* (2013.01); *H04L 9/3247* (2013.01)

(56) References Cited

U.S. PATENT DOCUMENTS

| | | | |
|---|---|---|---|
| 2010/0110935 A1 | 5/2010 | Tamassia et al. | |
| 2010/0153732 A1* | 6/2010 | Su | G06F 12/1408 713/176 |
| 2010/0158254 A1* | 6/2010 | Schaad | G06F 21/6209 380/282 |
| 2010/0281273 A1* | 11/2010 | Lee | G06F 21/72 713/190 |
| 2011/0208971 A1 | 8/2011 | Dhattacharya et al. | |
| 2012/0114123 A1* | 5/2012 | Garcia Morchon | H04L 9/3236 380/270 |
| 2013/0083926 A1 | 4/2013 | Hughes et al. | |
| 2014/0245020 A1 | 8/2014 | Buldas et al. | |
| 2014/0298022 A1* | 10/2014 | Proennecke | G06F 9/455 713/168 |
| 2015/0006899 A1 | 1/2015 | Seo et al. | |
| 2015/0207626 A1* | 7/2015 | Neftel | G08C 17/02 713/168 |
| 2016/0080156 A1* | 3/2016 | Kaliski, Jr. | H04L 9/3247 713/176 |
| 2017/0232300 A1* | 8/2017 | Tran | A63B 69/36 434/247 |
| 2018/0183774 A1* | 6/2018 | Campagna | H04L 63/067 |

OTHER PUBLICATIONS

Written opinion for PCT application No. PCT/US2017/032423, dated Jul. 24, 2017 (7 pages).

\* cited by examiner

TECHNOLOGIES FOR SECURE SOFTWARE UPDATE USING BUNDLES AND MERKLE SIGNATURES

CROSS-REFERENCE TO RELATED APPLICATION

The present application claims priority under 35 U.S.C. § 119(e) to U.S. Provisional Patent Application Ser. No. 62/349,077, entitled "TECHNOLOGIES FOR SECURE SOFTWARE UPDATE USING BUNDLES AND MERKLE SIGNATURES," which was filed on Jun. 12, 2016.

BACKGROUND

Software update distribution mechanisms typically rely on digital signatures for integrity protection. The platform vendor is typically responsible for assembling the various packages into a distribution image that is subsequently signed. The signature and image contents may use a manifest or cryptographic message syntax (e.g., CMS—RFC4108) as a way to describe what is being signed and to represent the signature. Some approaches require distribution of the entire manifest and contents in order that the signature can be verified. Additionally, asymmetric key verify operations may require key revocation checking, implying the need for connectivity to external certificate authority (CA) infrastructure. Also, asymmetric signing based on RSA, DSA, and/or ECDSA may be vulnerable to quantum computing attacks.

Certain open source projects such as Intel® Clear Linux, the Ostro Project, and the Zephyr Project use a scheme for managing the sets of packages and code modules that make up an OS distribution called "bundles." While it may be possible to use CMS or another form of manifest structure to sign a release bundle, it is often necessary for the installation agent to customize the update according to site-specific policies and preferences. This implies that the update bundle may contain a superset of all possible bundles and packages that could be selected at installation time. Under the Intel Clear Linux approach, each bundle may be obtained separately and dynamically. A manifest signature ensures the integrity of the manifest, which is also used to verify the integrity of individual bundles.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
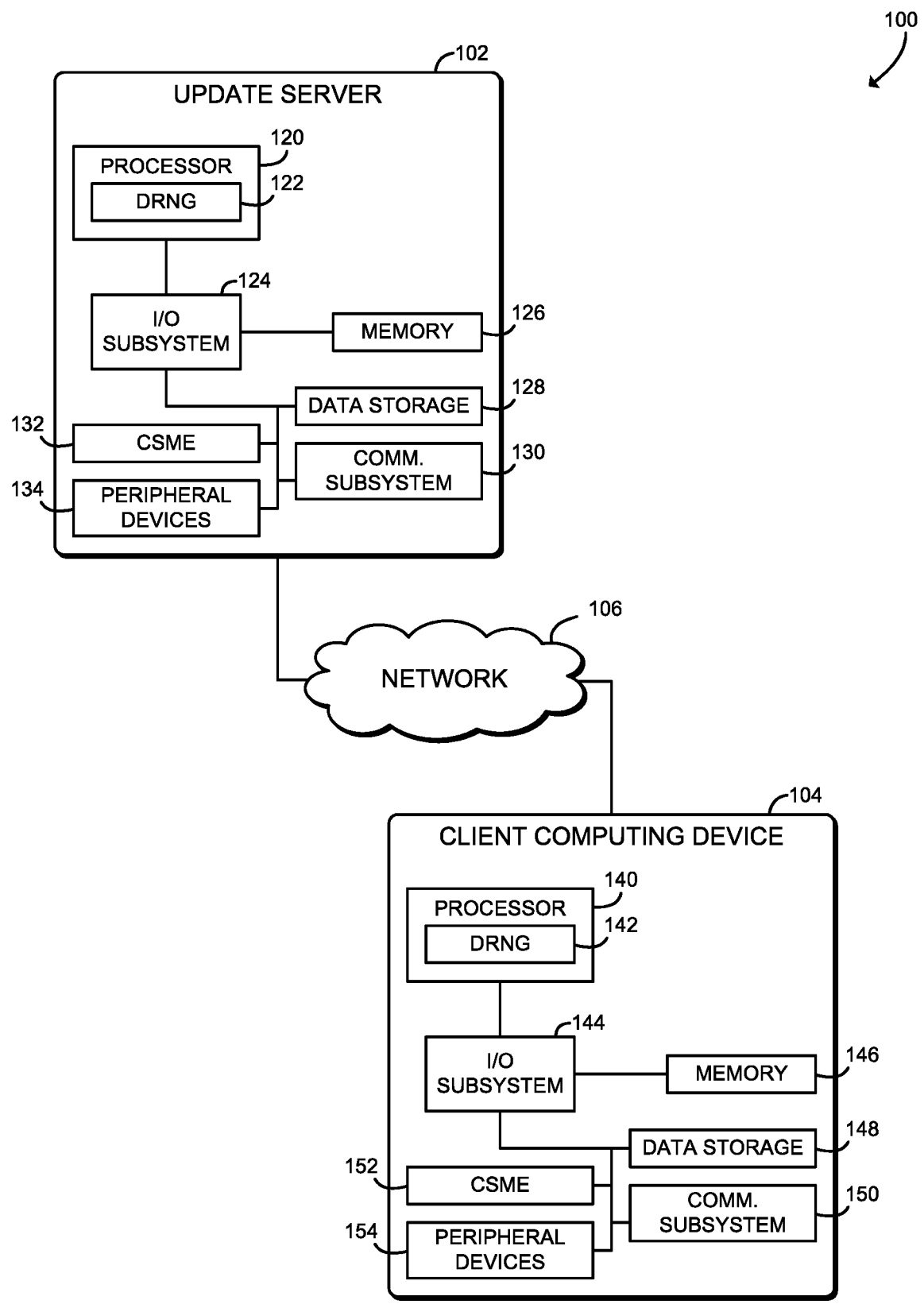
FIG. 1 is a simplified block diagram of at least one embodiment of a system for secure software updates.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for secure software updates includes an update server 102 and one or more client computing devices 104 in communication over a network 106. In use, as described in more detail below, the update server 102 constructs a integrity hash tree (also called a Merkle tree) from bundle and package contents of a software release, where each bundle, package, or file may contain a separate integrity hash. Each node of the integrity hash tree is correlated with a one-time signature public/private key pair using a Lamport key generation technique. A Merkle signing scheme authentication tree is generated, which may be used such that any file, package, or bundle (or combination thereof) of the software release may be authenticated as being part of an intended software release. Thus, the system 100 may allow individual packages and/or bundles to be dynamically requested by a software update agent of a client computing device 104 as needed, for example in response to an assessment of a dependency graph at package installation. Each release component may be individually authenticated or a hierarchy of objects may be authenticated. Additionally, the system 100 may allow the authentication to be checked efficiently, with O(N log N) or better scaling properties. Furthermore, constrained environment devices 104 (e.g., devices that may not include cryptographic acceleration co-processors and/or ASICs) may perform the authentication operation using only cryptographic hash functions such as SHA2. Additionally, implementations using certain processors, such as Intel® architecture processors, may be more efficient due to single instruction multiple data (SIMD) optimizations for hashing. Also, Lamport signatures and Merkle signature schemes have been shown to resist quantum attacks; therefore, the system 100 may allow existing software update agents that attempt to minimize network utilization during software update to continue to operate efficiently, while also taking advantage of quantum-safe signing schemes. Additionally, the system 100 may reduce the large, one-time key sizes of typical Merkle-Lamport signatures by sharing seed values that may be used to generate additional keys both for sub-tree protection and for subsequent software update releases.

The update server 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the update server 102 illustratively includes a processor 120, an input/output subsystem 124, a memory 126, a data storage device 128, and a communication subsystem 130. Of course, the update server 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. In some embodiments, the processor 120 may include support for cryptographic functions or other operations that may be used to accelerate certain cryptographic functions. For example, the processor 120 may include hardware support 122 for generating random numbers, such as a digital random number generator (DRNG) 122 included in certain processors manufactured by Intel® Corporation. As another example, the processor 120 may include support for single instruction multiple data (SIMD) instructions or other specialized processor instructions which may be used to accelerate certain cryptographic operations, such as calculating a cryptographic hash function.

The memory 126 may be embodied as any type of volatile or non-volatile memory or data storage capable of performing the functions described herein. In operation, the memory 126 may store various data and software used during operation of the update server 102 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the update server 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processors 120, the memory 126, and other components of the update server 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. As described further below, the data storage device 128 may store software release files and other components and related integrity and authentication data.

The communication subsystem 130 of the update server 102 may be embodied as any communication circuit, device, or collection thereof, capable of enabling communications between the update server 102, the client computing devices 104, and/or other remote devices over the network 106. The communication subsystem 130 may be configured to use any one or more communication technology (e.g., wired or wireless communications) and associated protocols (e.g., Ethernet, Bluetooth®, Wi-Fi®, WiMAX, etc.) to effect such communication.

As shown, the update server 102 may also include a converged security and manageability engine (CSME) 132 and one or more peripheral devices 134. The CSME 132 may be embodied as any hardware component(s) or circuitry capable of providing manageability and security-related services to the update server 102. In particular, the CSME 132 may include a microprocessor, microcontroller, or other embedded controller capable of executing firmware and/or other code independently and securely from the processor 120. Thus, the CSME 132 may be used to establish a trusted execution environment for the update server 102. The CSME 132 may communicate with the processor 120 and/or other components of the update server 102 over a dedicated bus, such as a host embedded controller interface (HECI). The CSME 132 may also provide remote configuration, control, or management of the update server 102. Further, in some embodiments, the CSME 132 is also capable of communicating using the communication subsystem 130 or a dedicated communication circuit independently of the state of the update server 102 (e.g., independently of the state of the main processor 120), also known as "out-of-band" communication. Illustratively, the CSME 132 is incorporated in a system-on-a-chip (SoC) of the update server 102; however, in some embodiments, the update server 102 may include one or more additional components capable of establishing a trusted execution environment, such as a security engine, an out-of-band processor, a Trusted Platform Module (TPM), and/or another security engine device or collection of devices. Subsequently or in connection with a CSME 132, a TPM, Intel SGX, or Intel Virtualization Technology, FPGA-based security co-processors may be used to store and protect the seed and derived keys used for Merkle-Lamport operations.

The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, microphone, network interface, and/or other input/output devices, interface devices, and/or peripheral devices.

Each client computing device 104 may be embodied as any type of computation or computer device capable of performing the functions described herein, including, without limitation, a mobile computing device, a smart phone, a computer, a laptop computer, a notebook computer, a tablet computer, a wearable computing device, a server, a network appliance, a web appliance, a distributed computing system, a processor-based system, and/or a consumer electronic device. Thus, the client computing device 104 includes components and devices commonly found in a computer or similar computing device, such as a processor 140 that may include a DRNG 142, an I/O subsystem 144, a memory 146, a data storage device 148, a communication subsystem 150, a CSME 152, and/or other peripheral devices 154. Those individual components of the client computing device 104 may be similar to the corresponding components of the update server 102, the description of which is applicable to the corresponding components of the client computing device 104 and is not repeated herein so as not to obscure the present disclosure.

As discussed in more detail below, the update server 102 and the client computing devices 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
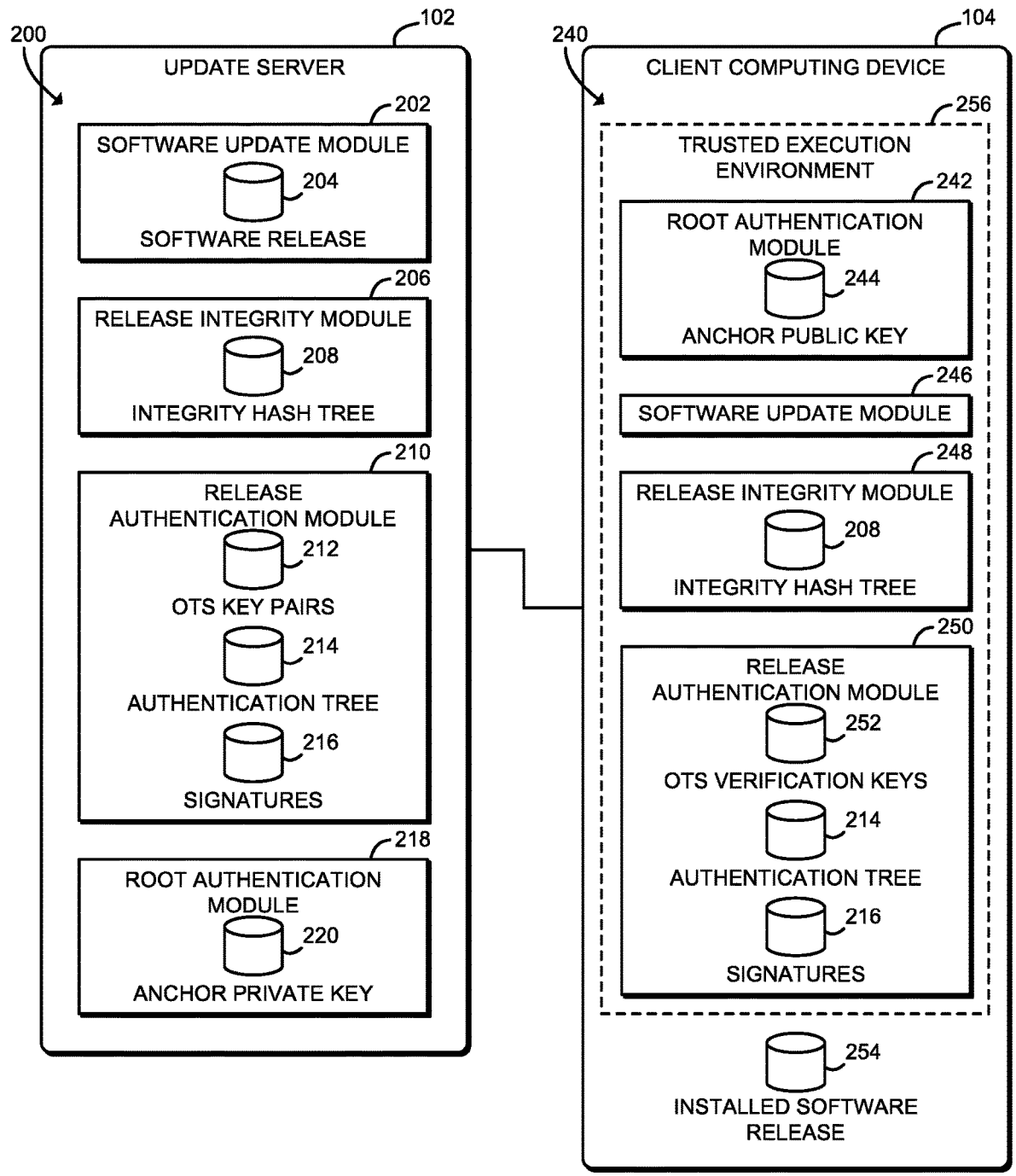
FIG. 2 is a simplified block diagram of at least one embodiment of various environments that may be established by the system of FIG. 1.

Referring now to FIG. 2, in an illustrative embodiment, the update server 102 establishes an environment 200 during operation. The illustrative environment 200 includes a software update module 202, a release integrity module 206, a release authentication module 210, and a root authentication module 218. The various modules of the environment 200 may be embodied as hardware, firmware, software, or a combination thereof. As such, in some embodiments, one or more of the modules of the environment 200 may be embodied as circuitry or collection of electrical devices (e.g., software update circuitry 202, release integrity circuitry 206, release authentication circuitry 210, and/or root authentication circuitry 218). It should be appreciated that, in such embodiments, one or more of the software update circuitry 202, the release integrity circuitry 206, the release authentication circuitry 210, and/or the root authentication circuitry 218 may form a portion of one or more of the processor 120, the I/O subsystem 124, and/or other components of the update server 102. Additionally, in some embodiments, one or more of the illustrative modules may form a portion of another module and/or one or more of the illustrative modules may be independent of one another.

The software update module 202 is configured to generate a software release 204. The software release 204 includes multiple release components and a release version number. The release components may be organized in a hierarchical structure of files, packages, bundles, or other components.

The release integrity module 206 is configured to generate an integrity hash tree 208 over the release components and the release version number of the software release 204. The integrity hash tree 208 may be embodied as a Merkle tree including a binary tree of hash nodes. In some embodiments, the release integrity module 206 may be configured to store hash nodes in a metadata field of the corresponding release component.

The release authentication module 210 is configured to generate multiple Lamport one-time signature public-private key pairs 212. Each key pair 212 corresponds to a hash node of the integrity hash tree 208. The release authentication module 210 is further configured to generate a Merkle signature scheme authentication tree 214 based on the key pairs 212 and to generate multiple one-time signatures 216. Each one-time signature 216 is generated as a function of a hash node of the integrity hash tree 208 and a key pair 212 that corresponds to the hash node. In some embodiments, the Lamport one-time signature public-private key pairs 212 may be generated with a pseudo-random number generator, based on a random number seed. The release authentication module 210 may be further configured to generate the random number seed with a hardware-assisted random number generator, such as the DRNG 122 of the processor 120. In some embodiments, the release authentication module may be further configured to index an entropy multiplexing tree with the release version number to retrieve the random number seed. The release authentication module 210 may be further configured to transmit the random number seed to a client computing device 104.

The root authentication module 218 is configured to sign a root public key of the authentication tree 214 with an anchor private key 220 to generate a signature of the root public key. The anchor private key 220 is paired with an anchor public key 244, as described further below. In some embodiments, the root authentication module 218 may be further configured to provision a client computing device 104 with the anchor public key 244.

The software update module 202 may be further configured to transmit one or more release components of the software release 204 and associated one-time signatures 216 to a client computing device 104. The one-time signatures 216 correspond to hash nodes of the integrity hash tree 208 that, in turn, correspond to the release components of the software release 204. The software update module 202 may be further configured to transmit the integrity hash tree 208, the authentication tree 214, the signature of the authentication tree 214, a part of the authentication tree 214 such as an authentication path corresponding to a signature 216, and/or a public key of the key pairs 212 corresponding to a signature 216 to the client computing device 104.

Still referring to FIG. 2, in the illustrative embodiment, a client computing device 104 establishes an environment 240 during operation. The illustrative environment 240 includes a root authentication module 242, a software update module 246, a release integrity module 248, and a release authentication module 250. In some embodiments, the environment 240 may also include a trusted execution environment 256. The various modules of the environment 240 may be embodied as hardware, firmware, software, or a combination thereof. As such, in some embodiments, one or more of the modules of the environment 240 may be embodied as circuitry or collection of electrical devices (e.g., root authentication circuitry 242, software update circuitry 246, release integrity circuitry 248, and/or release authentication circuitry 250). It should be appreciated that, in such embodiments, one or more of the root authentication circuitry 242, the software update circuitry 246, the release integrity circuitry 248, and/or the release authentication circuitry 250 may form a portion of one or more of the processor 140, the I/O subsystem 144, and/or other components of the client computing device 104. Additionally, in some embodiments, one or more of the illustrative modules may form a portion of another module and/or one or more of the illustrative modules may be independent of one another.

The root authentication module 242 is configured to receive the root public key of the Merkle signature scheme authentication tree 214 associated with a software release 204 and a signature of the root public key from the update server 102. The root authentication module 242 is further configured to verify the root public key with the signature of the root public key and the anchor public key 244 that is provisioned to the client computing device 104. In some embodiments, the root authentication module 242 may be configured to receive the authentication tree 214 from the update server 102. Additionally or alternatively, in some embodiments the root authentication module 242 may be configured to receive a random number seed from the update server 102, generate the Lamport one-time signature public-private key pairs 212 with a pseudo-random number generator based on the random number seed, and generate the authentication tree 214 based on the key pairs 212. In some embodiments, the root authentication module 242 may be configured to generate an entropy multiplexing tree as a function of a root seed provisioned to the client computing device 104, index the entropy multiplexing tree with a release version number of the software release to retrieve a random number seed, generate the Lamport one-time signature public-private key pairs 212 with a pseudo-random number generator based on the random number seed, and generate the authentication tree 214 based on the key pairs 212. The root authentication module 242 is further configured to verify the authentication tree 214 with the root public key.

The software update module 246 is configured to request the update server 102 for one or more release components of the software release 204. The software update module 246 is further configured to receive, from the update server 102, one or more release components of the software release 204, hash nodes of the integrity hash tree 208 that correspond to the release components, and one or more Lamport one-time signatures 216 that correspond to the hash nodes of the integrity hash tree 208. The software update module 246 may be further configured to receive a release version number of the software release 204 and corresponding hash nodes of the integrity hash tree 208 and associated signatures 216. The software update module 246 may be further configured to install the release components in response to verification of the release components, the hash nodes, and the one-time signatures 216. The release components may be installed to, for example, an installed software release 254 of the client computing device 104.

The release integrity module 248 is configured to verify the release components with the associated hash nodes of the integrity hash tree 208. The release integrity module 248 may be further configured to verify the release version number with the associated hash nodes of the integrity hash tree 208. The release integrity module 248 may be further configured to receive the integrity hash tree 208 from the update server 102.

The release authentication module 250 is configured to verify the hash nodes of the integrity hash tree 208 with the corresponding one-time signatures 216. The one-time signatures 216 may be authenticated with corresponding one-time signature verification keys 252, which may be embodied as the one-time signature key pairs 212 or the public keys of the one-time signature key pairs 212. The release authentication module 250 is further configured to verify the one-time signatures 216 with the authentication tree 214 in response to verifying the authentication tree 214.

The trusted execution environment 256 may be embodied as any isolated and secure execution environment within the environment 240. Code and/or data accessed by the trusted execution environment 256 may be validated and protected from unauthorized access and/or modification. Additionally, the trusted execution environment 256 has access to dedicated, secure storage (not shown in FIG. 2). In the illustrative embodiment, the trusted execution environment 256 is provided by the CSME 152, which provides a secure execution environment that is independent from the processor 140 of the client computing device 104. Additionally or alternatively, in other embodiments the trusted execution environment 256 may be provided with a secure enclave or other secure software environment such as an Intel SGX secure enclave, an AMD® TrustZone® secure world, or other secure environment. As shown, the trusted execution environment 256 may include the root authentication module 242, the software update module 246, the release integrity module 248, and the release authentication module 250 along with associated data. Thus, the trusted execution environment 256 may store sensitive data such as the anchor public key 244, the integrity hash tree 208, the public keys of the key pairs 212, the authentication tree 214, and/or the signatures 216 in secure storage of the client computing device 104.

Figure 3:
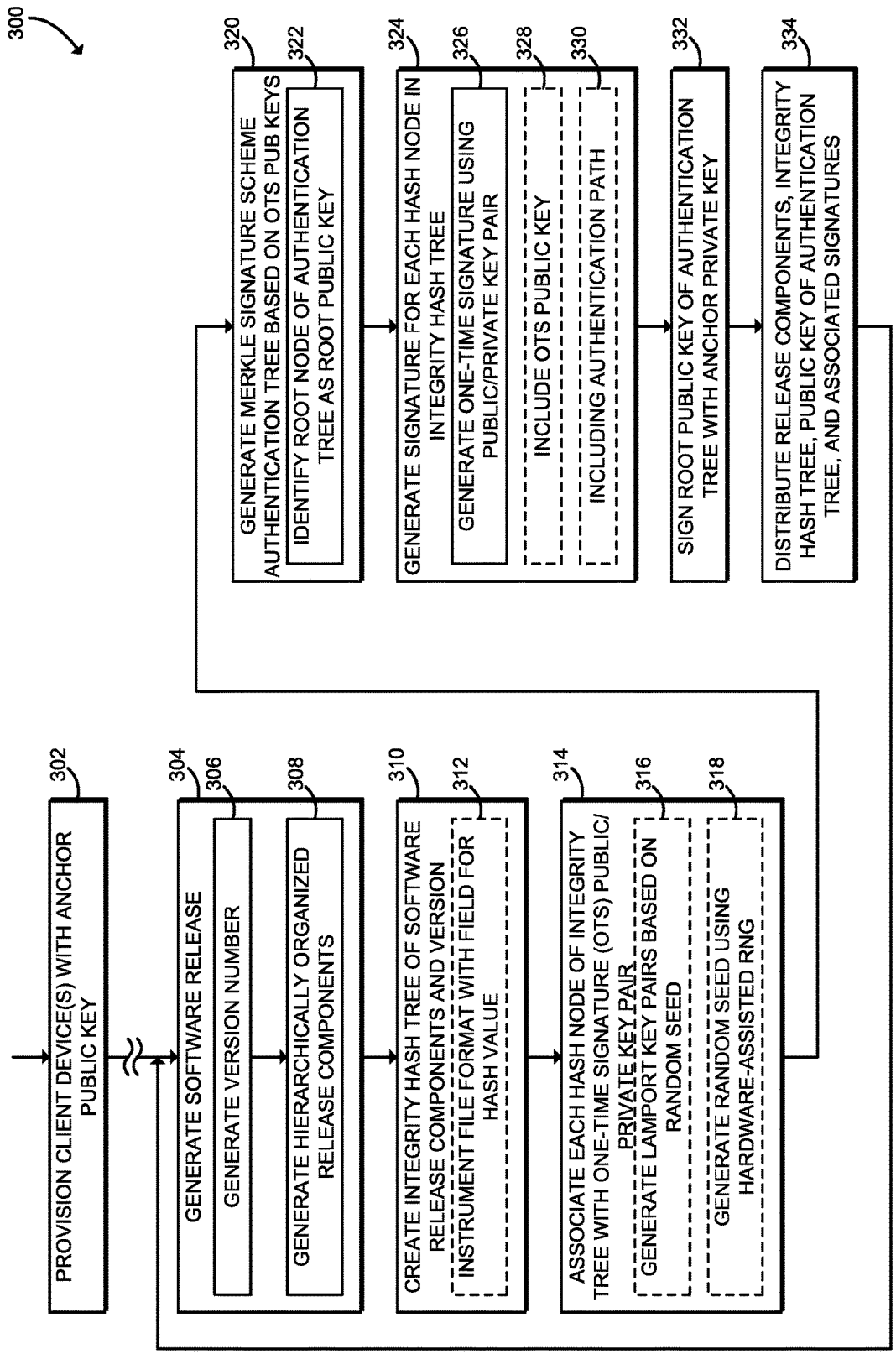
FIG. 3 is a simplified flow diagram of at least one embodiment of a method for secure software updates that may be executed by an update server of FIGS. 1-2.

Referring now to FIG. 3, in use, the update server 102 may execute a method 300 for secure software updates. It should be appreciated that, in some embodiments, the method 300 may be embodied as various instructions stored on a computer-readable media, which may be executed by the processor 120 and/or other components of the update server 102 to cause the update server 102 to perform the method 300. The computer-readable media may be embodied as any type of media capable of being read by the update server 102 including, but not limited to, the memory 126, the data storage device 128, other memory or data storage devices of the update server 102, portable media readable by a peripheral device of the update server 102, and/or other media.

The method 300 begins in block 302, in which the update server 102 provisions one or more client computing devices 104 with the anchor public key 244. The update server 102 may use any technique to securely provision the client computing device 104 with the anchor public key 244. Additionally, although illustrated as being provisioned by the update server 102, in some embodiments each client computing device 104 may be provisioned with the anchor public key 244 by a different device and/or entity. For example, each client computing device 104 may be provisioned with the anchor public key 244 when manufactured.

The anchor public key 244 may be embodied as any asymmetric signing key corresponding to the anchor private key 220. For example, in some embodiments the anchor public key 244 and the anchor private key 220 may be embodied as a Lamport one-time signature key pair and/or a Merkle signature scheme key pair. The anchor key may use a Merkle or Lamport signing algorithm and hence may be limited to one-time-use. In some embodiments, if the anchor key is a Merkle and/or Lamport key, a pseudo-random number generator (PRNG) seed value may be embedded in the client computing device 104 and shared with the update server 102 such that the next anchor key may be generated.

The method 300 continues in block 304, in which the update server 102 generates a software release 204. The software release 204 may be embodied as a particular version of a collection of software including components that are compatible and/or consistent with each other. For example, the software release 204 may be embodied as a particular version of an operating system, a firmware environment, a software application or application suite, and/or another collection of software. In block 306, the update server 102 generates a version number for the software release 204. The version number may be used to uniquely identify particular software releases 204. Since all components of the software release 204 share the same version, a client computing device 104 that installs a particular software release 204 may be confident that all sub-components of the software release 204 have been updated to the appropriate version. In block 308, the update server 102 generates a hierarchically organized structure of release components of the software release 204. Because the software release 204 is hierarchically organized, each client computing device 104 may install part or all of the release components of the software release 204. For example, in some embodiments, the software release 204 may be structured into files, packages, and bundles. Each package may include one or more files, and each bundle may include one or more packages. A client computing device 104 may update a particular bundle, which in turn updates the included packages and files. As described above, each release component of the software release 204 is associated with the version number of the software release 204.

In block 310, the update server 102 generates an integrity hash tree 208 for the software release 204 based on the release components and the version number of the software release 204. The update server 102 may use a cryptographic hash function such as SHA2 to calculate hash values of release components of the software release 204 and then create leaf hash nodes in the integrity hash tree 208 corresponding to those release components. The update server 102 may build the rest of the integrity hash tree 208 by concatenating two or more leaf hash nodes, calculating a new hash value for a resulting parent node, and continuing up toward the root of the integrity hash tree 208. Hash nodes of the integrity hash tree 208 may correspond with release components of the software release 204, allowing the integrity hash tree 208 to reflect the hierarchical structure of the software release 204. The update server 102 may also calculate a hash value of the version number and create a leaf hash node corresponding to the version number. The root node of the integrity hash tree 208 may be calculated by concatenating the parent hash value generated over the release components with the hash value of the version number and then calculating a new hash value for the root node.

In some embodiments, in block 312, the update server 102 may instrument file format structures with a field to store the associated object's hash. The update server 102 may store the hash in a metadata field of the associated release component. For example, the update server 102 may use file formats such as Authenticode in which a file hash may be stored. In some embodiments an operating system, hypervisor, or other control software may update the hash value whenever the associated file is successfully written and/or updated. Thus, a software update server process may not need to perform the update directly, thereby removing some of the overhead involved in maintaining hash consistency. Accordingly, the update server 102 may manage large numbers of individual hashable objects (e.g., files, packages, bundles, or other release components) while maintaining strict control over the hash results and versioned changes to objects.

Figure 4:
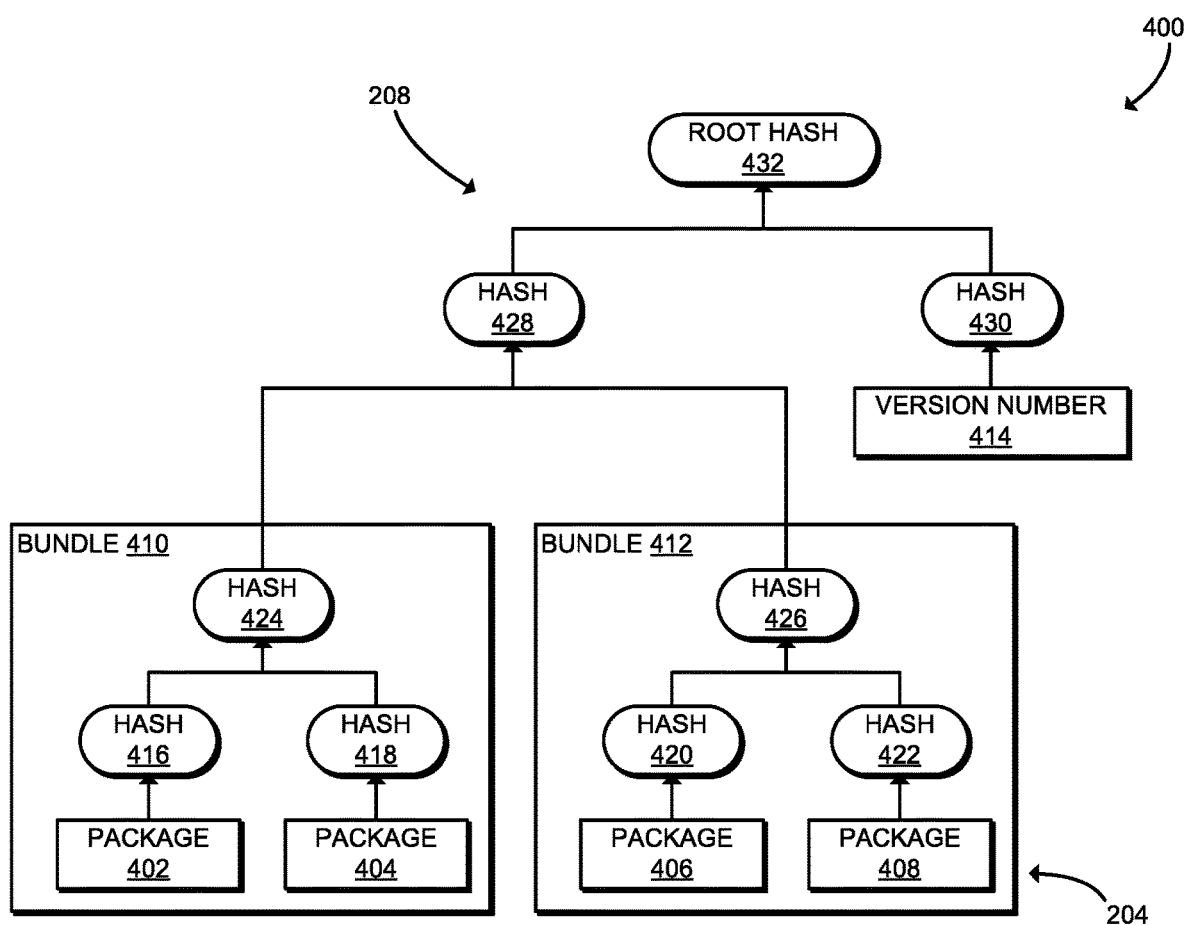
FIG. 4 is a schematic diagram illustrating a software release and an integrity hash tree that may be processed by the system of FIGS. 1-2.

Referring now to FIG. 4, diagram 400 illustrates a software release 204 and associated integrity hash tree 208. The software release 204 illustratively includes four packages 402, 404, 406, 408. Each package may include multiple files or other sub-components that are not illustrated in FIG. 4, for clarity. The software release 204 further includes two bundles 410, 412, which are release components that include packages. Illustratively, the bundle 410 includes the packages 402, 404 and the bundle 412 includes the packages 406, 408. Of course, it should be understood that in many embodiments the software release 204 will contain many more packages, bundles, or other release components. Additionally, although illustrated as a two-level hierarchy, it should be understood that in some embodiments the software release 204 may include a different number of levels. As shown, the software release 204 also includes a version number 414.

As shown, the integrity hash tree 208 may be embodied as a Merkle hash tree including multiple hash nodes. Illustrative leaf hash nodes 416, 418, 420, 422 are generated by calculating hash values for the packages 402, 404, 406, 408, respectively. The parent hash node 424 is generated by concatenating the hash nodes 416, 418 and then calculating a hash value, and the parent hash node 426 is generated by concatenating the hash nodes 420, 422 and then calculating a hash value. The hash nodes 424, 426 represent the corresponding bundles 410, 412, respectively. The hash node 428 is generated by concatenating the hash nodes 424, 426 and then calculating a hash value. The leaf hash node 430 is generated by calculating a hash value for the version number 414. The root hash node 432 is generated by concatenating the hash nodes 428, 430 and then calculating a hash value. Accordingly, the version number 414 of the software release 204 is universally applied over all release components of the software release 204 (e.g., bundles 410, 412 and packages 402, 404, 406, 408).

Referring back to FIG. 3, in block 314, after creating the integrity hash tree 208, the update server 102 associates each hash node of the integrity hash tree 208 with a Lamport one-time signature public/private key pair 212. A Lamport private key may be embodied as a string of random numbers, and the associated Lamport public key may be embodied as a string of numbers in which each number is equal to the hash of the corresponding number in the private key. In some embodiments, in block 316 the update server 102 may generate the Lamport key pairs 212 based on a random number seed. For example, the update server 102 may supply the random number seed to a pseudo-random number generator (PRNG) and use the PRNG to generate a series of pseudorandom numbers that may be used for the private keys. As described further below, the same random number seed may be used to seed a PRNG on each of the client computing devices 104. In an embodiment where secure time exists, an entropy multiplexing (EM) seed tree indexed to time may be used to synchronize which seed is used by correlating the seed tree with time/date, as described in International Application No. 2015/099661 A1, by Deleeuw et al. In some embodiments, in block 318, the update server 102 may generate the random number seed using a hardware-assisted true random number generator, such as the digital random number generator (DRNG) 122 of the processor 120 or other secure entropy source.

In some embodiments, an EM tree may further be used to index a seed value to be used in connection with a future version according to a versioning scheme that may involve increments in major, minor, or build sequence numbers. For example, new Lamport keys may be generated for protection of future update images by finding the seed position corresponding to the expected version number or numbers. An initial provisioning of a root seed of an EM tree may be sufficient to establish the Lamport key generation scheme for all future updates to a device during its expected lifetime.

In block 320, the update server 102 generates a Merkle signature scheme authentication tree 214 for the one-time signature public keys associated with the integrity hash tree 208. Each leaf node of the authentication tree 214 may correspond to a hash value of a one-time signature public key associated with a hash node of the integrity hash tree 208. Those leaf nodes of the authentication tree 214 are concatenated and hashed to generate the parent nodes of the authentication tree 214, up to the root node. In block 322, the update server 102 identifies the root node of the authentication tree 214 as the root public key for the software release 204.

In block 324, the update server 102 generates a signature 216 for each hash node of the integrity hash tree 208 using the one-time signature key pairs 212 and the authentication tree 214. As described further below, the signature 216 may be used to verify the authenticity of the corresponding hash node; that is, a client computing device 104 may use the signature 216 to verify that a hash node was created and signed by the update server 102, and therefore verify that the associated release component is authentic. In block 326, the update server 102 generates a one-time signature of a hash node using the private key of the corresponding key pair 212. For example, to generate a Lamport one-time signature, the update server 102 may select particular random numbers from the private key to include in the signature based on the value of corresponding bits of the hash node. In some embodiments, in block 328 the update server 102 may include the corresponding one-time signature public key in the signature 216. As described above, a leaf node of the authentication tree 214 corresponds to a hash value of the public key. A client computing device 104 may use the public key to verify the one-time signature. In some embodiments, in block 330 the update server 102 may include an authentication path in the signature 216. As described further below, the authentication path may include sibling nodes from the authentication tree 214 that may be used to verify the authenticity of the public key.

Figure 5:
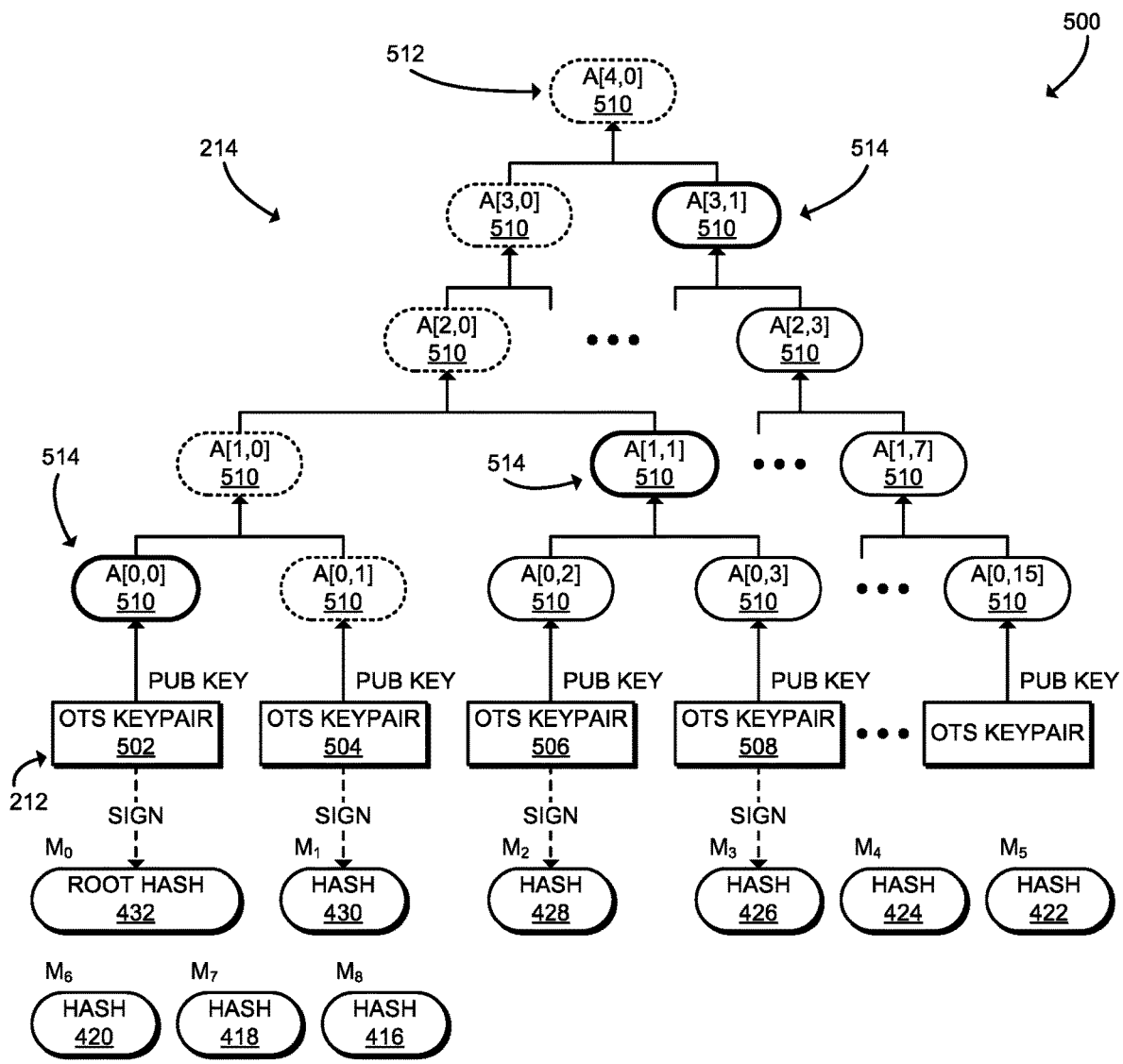
FIG. 5 is a schematic diagram illustrating one-time key pairs and an authentication tree that may be processed by the system of FIGS. 1-2.

Referring now to FIG. 5, diagram 500 illustrates a release authentication tree 214 that may be generated for the integrity hash tree 208 shown in FIG. 4. As shown, the illustrative hash nodes 432, 430, 428, 426, 424, 422, 420, 418, 416 of the integrity hash tree 208 become messages $M_0$ through $M_8$ that are to be signed using the Merkle signature scheme. A series of one-time signatures key pairs 212 is generated for the hash nodes, with key pair 502 assigned to hash node 432, key pair 504 assigned to hash node 430, key pair 506 assigned to hash node 428, key pair 508 assigned to hash node 426, and so on.

As shown, the authentication tree 214 is a binary hash tree of nodes 510. The authentication tree 214 includes n leaf nodes and has a depth of x, where $n=2^x$; that is, the number of leaf nodes is a power of 2. For example, the illustrative authentication tree 214 includes n=16 leaf nodes with a depth x=4, which is large enough for the nine nodes of the illustrative integrity hash tree 208. The leaf nodes 510 of the authentication tree 214 are labeled as nodes A[0, 0] to A[0, 15]. Each node A[0, 0] through A[0, 15] is generated by calculating a hash value of a public key from a corresponding key pair 212. For example, node A[0, 0] is the hash of the public key of key pair 502, node A[0, 1] is the hash of the public key of key pair 504, and so on. The next level of the authentication tree 214 is labeled as nodes A[1, 0] to A[1, 7] and are each generated by concatenating a pair of corresponding child nodes and then calculating a hash value. Further levels of the authentication tree 214 are generated similarly, up to the root node A[x, 0], which is illustratively labeled A[4, 0]. The root node A[x, 0] is the root public key 512 of the authentication tree 214. As described above, the private keys of the associated key pairs 212 may be used to sign the nodes of the integrity hash tree 208.

Figure 6:
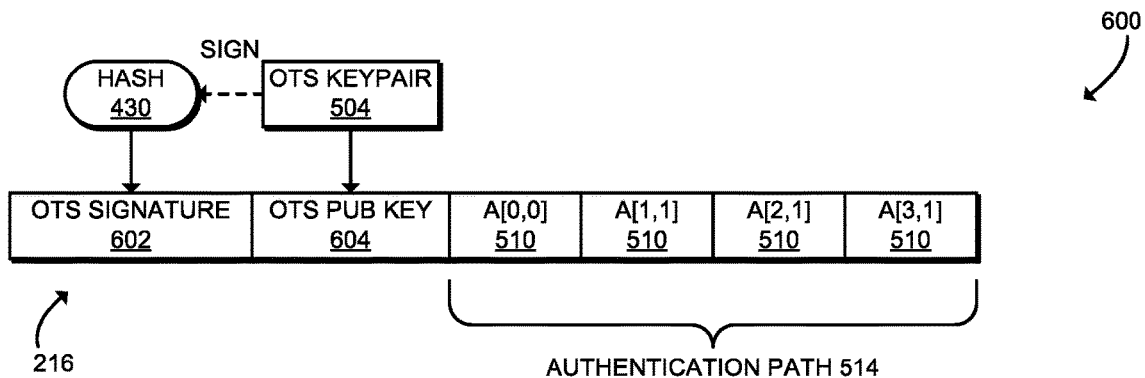
FIG. 6 is a schematic diagram illustrating a one-time signature that may be processed by the system of FIGS. 1-2.

Referring now to FIG. 6, diagram 600 illustrates a signature 216 that may be generated using the key pairs 212 and the authentication tree 214. The illustrative signature 216 is generated for the hash node 430, using the one-time signature key pair 504, as shown in FIG. 5. The private key of the key pair 504 is used to sign the hash node 430, which generates the one-time signature 602. The public key of the key pair 504 is illustratively included in the signature 216 as the one-time signature public key 604. The one-time signature 602 and the associated public key 604 may be used to verify that the hash 430 was signed by the key pair 504. The illustratively signature 216 also includes an authentication path 514 that includes nodes selected from the authentication tree 214. As shown in FIG. 5, the authentication path 514 includes nodes 510 from the authentication tree 214 that may be used to verify the one-time signature public key 604. Illustratively, the authentication path 514 includes the nodes A[0, 0], A[1, 1], A[2, 1], and A[3, 1].

For example, referring again to FIG. 5, to verify a signature 216 of the hash node 430, a verifier (e.g., a client computing device 104) may calculate a hash of the one-time signature public key 604, which corresponds to the node A[0, 1] of the authentication tree 214. The verifier may concatenate the node A[0, 1] with the node A[0, 0] from the authentication path 514 and then calculate a hash value, which corresponds to the node A[1, 0]. The verifier proceeds up authentication tree 214 using the authentication path 514 until a value for the root node A[4, 0] is calculated. If the calculated value for the root node A[4, 0] matches the root public key 512, then the signature 216 is verified.

Referring back to FIG. 3, in block 332 the update server 102 signs the root public key of the authentication tree 214 with the anchor private key 220. As described above, the client computing devices 104 have been provisioned with the corresponding anchor public key 244. Thus, the anchor public key 244 may be used to authenticate the root public key of the authentication tree 214 and thus authenticate any component of the software release 204.

In block 334, the update server 102 distributes the release components of the software release 204, the integrity hash tree 208, the public keys of the authentication tree 214, and the associated signatures 216 to the client computing devices 104. As described further below, the update server 102 may distribute release components and other data on-demand, allowing a client computing device 104 to request a particular sub-set of the release components during software update and/or configuration. After distributing the software release 204, the method 300 loops back to block 302 to process additional software updates.

Figure 7:
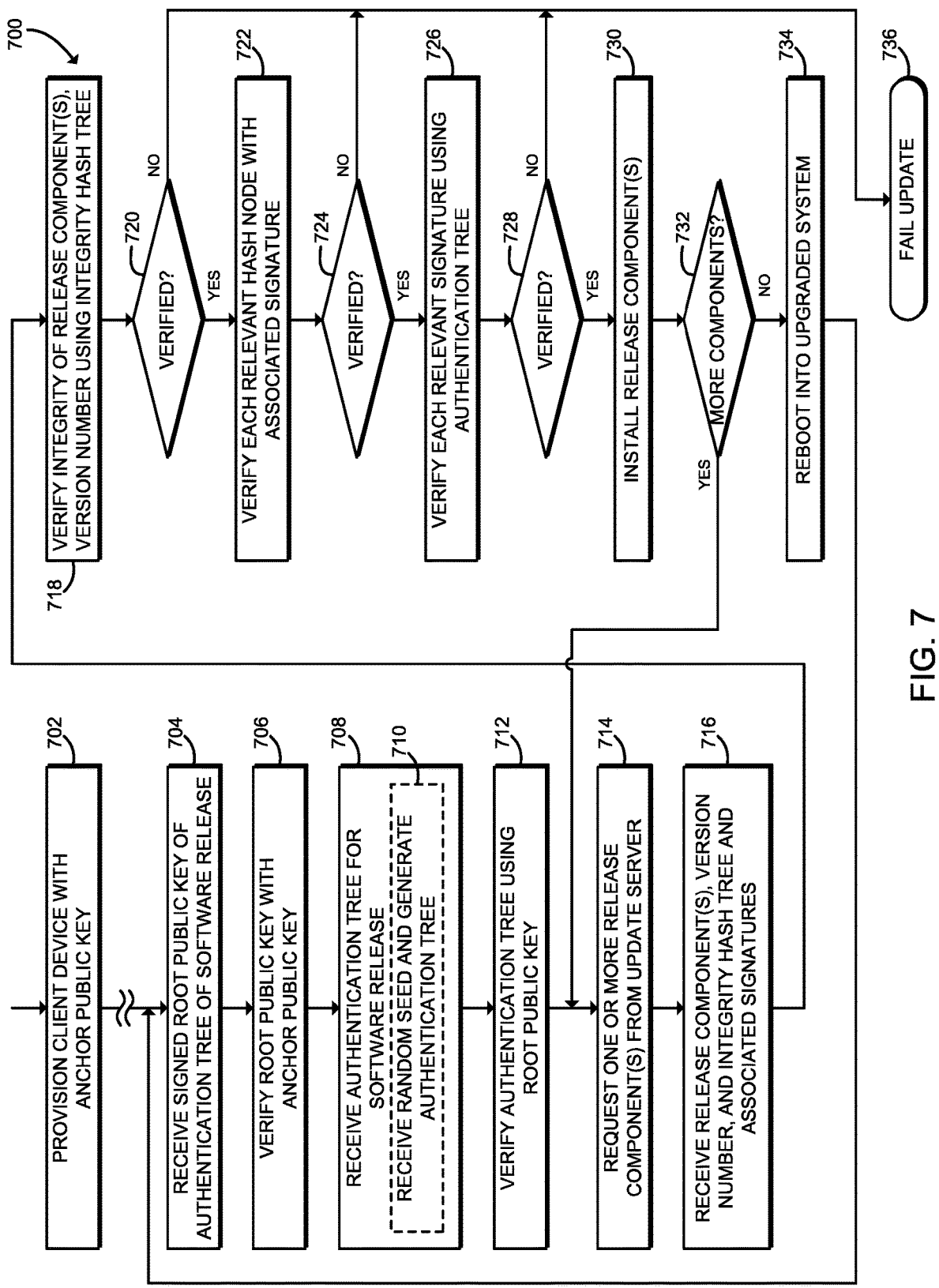
FIG. 7 is a simplified flow diagram of at least one embodiment of a method for secure software updates that may be executed by a client computing device of FIGS. 1-2.

Referring now to FIG. 7, in use, a client computing device 104 may execute a method 700 for secure software updates. It should be appreciated that, in some embodiments, the method 700 may be embodied as various instructions stored on a computer-readable media, which may be executed by the processor 140 and/or other components of the client computing device 104 to cause the client computing device 104 to perform the method 700. The computer-readable media may be embodied as any type of media capable of being read by the client computing device 104 including, but not limited to, the memory 146, the data storage device 148, other memory or data storage devices of the client computing device 104, portable media readable by a peripheral device of the client computing device 104, and/or other media.

The method 700 begins with block 702, in which the client computing device 104 is provisioned with the anchor public key 244. As described above in connection with FIG. 3, in some embodiments the update server 102 may securely provision the client computing device 104 with the anchor public key 244. Additionally or alternatively, in some embodiments the client computing device 104 may be provisioned with the anchor public key 244 by a different device and/or entity. For example, the client computing device 104 may be provisioned with the anchor public key 244 when manufactured. As described above, the anchor public key 244 may be embodied as any asymmetric signing key corresponding to the anchor private key 220. For example, in some embodiments the anchor public key 244 and the anchor private key 220 may be embodied as a Lamport one-time signature key pair and/or a Merkle signature scheme key pair. The anchor key may use a Merkle or Lamport signing algorithm and hence may be limited to one-time-use. In some embodiments, if the anchor key is a Merkle and/or Lamport key, a pseudo-random number generator (PRNG) seed value may be embedded in the client computing device 104 and shared with the update server 102 such that the next anchor key may be generated.

In block 704, the client computing device 104 receives a signed root public key of the authentication tree 214 for a software release 204 from the update server 102. As described above, the root public key is the root node of the authentication tree 214, labeled as the node A[x, 0], where x is the depth of the authentication tree 214. The root public key is signed by the update server 102 with the anchor private key 220. In block 706, the client computing device 104 verifies the root public key using the anchor public key 244. As described further below, the verified root public key may be used to verify each of the public keys corresponding to the nodes A[0, 0] to A[x, 0] in the authentication tree 214. If the root public key is not verified, the client computing device 104 may terminate the update process or otherwise indicate an error in the update process.

In block 708, the client computing device 104 receives the authentication tree 214 for the software release 204 from the update server 102. In some embodiments, in block 710, the client computing device 104 may receive a random number seed from the update server 102 and generate the authentication tree 214 based on the random number seed. The client computing device 104 may generate the authentication tree 214 using a process similar to that of the update server 102, described above in connection with block 316 of FIG. 3. For example, the client computing device 104 may supply the random number seed to a pseudo-random number generator (PRNG) and use the PRNG to generate a series of pseudo-random numbers that may be used for the private keys. The client computing device 104 may generate the associated public keys and the Merkle signature scheme authentication tree 214 based on the generated private keys, as described above in connection with FIG. 3. In an embodiment where secure time exists, an entropy multiplexing (EM) seed tree indexed to time may be used to synchronize which seed is used by correlating the seed tree with time/date, as described in International Application No. 2015/099661 A1, by Deleeuw et al. Transmitting the random seed rather than the entire authentication tree 214 may reduce the required network bandwidth and/or transfer time for the update process.

In block 712, the client computing device 104 verifies the authentication tree 214 using the root public key verified as described above in connection with block 706. To verify the authentication tree 214, the client computing device 104 may compare the root public key to the root node A[x, 0] of the authentication tree 214. If the authentication tree 214 is not verified, the client computing device 104 may terminate the update process or otherwise indicate an error in the update process.

In block 714, the client computing device 104 requests one or more release components from the update server 102. For example, a software update agent of the client computing device 104 may determine one or more bundles, packages, and/or files that are necessary to update the current client computing device 104. The requested release components may correspond to installed bundles and/or packages of the installed software release 254, package dependencies, or other requirements. The request sent to the update server 102 may identify only the necessary release components, which may reduce the required network bandwidth as compared to retrieving the entire software release 204.

In block 716, the client computing device 104 receives the requested release components from the update server 102 (e.g., the requested bundles, packages, files, or other release components). The client computing device 104 also receives data that may be used to verify the release components. For example, the client computing device 104 may receive the version number of the software release 204, the integrity hash tree 208 associated with the software release 204, and one or more signatures 216 of nodes of the integrity hash tree 208. As described above, the signatures 216 may include the one-time signature public keys corresponding to the private keys used to sign the nodes of the integrity hash tree 208.

In block 718, the client computing device 104 verifies the integrity of the received release components and the release version number using the integrity hash tree 208. For example, the client computing device 104 may calculate hash values of the received release components and release version number and compare those calculated values to the corresponding nodes of the integrity hash tree 208. If the release components and/or version number have been altered (e.g., due to transmission error, malicious interference, or otherwise), then the calculated hash values will not match the integrity hash tree 208. In block 720, the client computing device 104 determines whether the integrity of the release components and the version number was successfully verified. If so, the method 700 advances to block 722, described below. If not verified, the method 700 branches to block 736, in which the client computing device 104 indicates that the update process has failed. The client computing device 104 may terminate the update process, roll back update changes, log an error, perform a security response, or otherwise respond to the update failure.

Referring back to block 720, if verified the method 700 advances to block 722, in which the client computing device 104 verifies each relevant hash node of the integrity hash tree 208 with the associated signature 216. Verifying a hash node indicates that the value of the hash node has not been modified and thus verifies the integrity of the integrity hash tree 208 itself. The client computing device 104 may, for example, verify a Lamport one-time signature associated with each relevant hash node using an associated public key. As described above, the public keys may be received from the update server 102 along with the release component, generated by the client computing device 104 based on a random seed, or otherwise obtained by the client computing device 104. In some embodiments, the client computing device 104 may index an entropy multiplexing (EM) tree with the release version number to retrieve the random seed. An initial provisioning of a root seed of the EM tree may be sufficient to establish the Lamport key generation scheme for all future updates to the client computing device 104 during its expected lifetime. In block 724, the client computing device 104 determines whether the relevant hash nodes were successfully verified. If so, the method 700 advances to block 726, described below. If not verified, the method 700 branches to block 736, in which the client computing device 104 indicates that the update process has failed. The client computing device 104 may terminate the update process, roll back update changes, log an error, perform a security response, or otherwise respond to the update failure.

Referring back to block 724, if verified the method 700 advances to block 726, in which the client computing device 104 verifies each relevant signature 216 using the authentication tree 214. The client computing device 104 verifies that the one-time signature public key associated with each signature 216 matches the appropriate node of the authentication tree 214. For example, the client computing device 104 may calculate a hash value of the one-time signature public key and compare that hash value to the appropriate leaf node A[0, i] of the authentication tree 214. As another example, the client computing device 104 may verify the one-time signature public key with an associated authentication path as described above in connection with FIGS. 5-6. In block 728, the client computing device 104 determines whether the relevant signatures 216 were successfully verified. If so, the method 700 advances to block 730, described below. If not verified, the method 700 branches to block 736, in which the client computing device 104 indicates that the update process has failed. The client computing device 104 may terminate the update process, roll back update changes, log an error, perform a security response, or otherwise respond to the update failure Referring back to block 728, if verified the method 700 advances to block 730, in which the client computing device 104 installs the received release components. At this point, the integrity of each release component has been verified by the integrity hash tree 208, the integrity hash tree 208 has been verified using the associated signatures 216 and the authentication tree 214, the authentication tree 214 has been verified with its associated root public key, and the root public key has been verified with the anchor public key 244. Thus, each received release components has been fully verified. The client computing device 104 may similarly verify the integrity of any package, bundle, file, or other release component of the software release 204. Furthermore, for any release component in a software release 204 received by the client computing device 104, the client computing device 104 may unambiguously determine whether the release component has been assigned the version number also included in the software release 204, thereby preserving the versioning semantics for bundle profiles. The client computing device 104 may install the release components by updating the contents of the installed software release 254, updating a local software update cache or update queue, or otherwise updating the client computing device 104.

In block 732, the client computing device 104 determines whether additional release components should be downloaded and installed from the update server 102. For example, a software update agent may repeat determining which packages and/or bundles are actually necessary for the current client computing device 104 (e.g., if needed to resolve transitive dependencies) until the right subset of components are in place. If additional release components should be downloaded, the method 700 loops back to block 714 to request, verify, and install additional release components. If no additional release components remain, the method 700 advances to block 734, in which the client computing device 104 reboots into an updated system. For example, the client computing device 104 may update the installed software release 254 or otherwise activate the updated software release. After rebooting, the method 700 loops back to block 704, in which the client computing device 104 may process additional updates.

EXAMPLES

Illustrative examples of the technologies disclosed herein are provided below. An embodiment of the technologies may include any one or more, and any combination of, the examples described below.

Example 1 includes a computing device for secure software update, the computing device comprising: a software update module to generate a software release, wherein the software release comprises a plurality of release components and a release version number; a release integrity module to generate an integrity hash tree over the plurality of release components and the release version number, wherein the integrity hash tree comprises a plurality of hash nodes; a release authentication module to (i) generate a plurality of Lamport one-time signature public-private key pairs, wherein each key pair of the plurality of key pairs corresponds to a hash node of the integrity hash tree, (ii) generate a Merkle signature scheme authentication tree based on the plurality of key pairs, and (iii) generate a plurality of one-time signatures, wherein each one-time signature is generated as a function of a hash node of the integrity hash tree and a key pair of the plurality of key pairs corresponding to the hash node; and a root authentication module to sign a root public key of the authentication tree with an anchor private key to generate a signature of the root public key, wherein the anchor private key is paired with an anchor public key.

Example 2 includes the subject matter of Example 1, and wherein to generate the software release comprises to generate a hierarchical organization of the plurality of release components.

Example 3 includes the computing device any of Examples 1 and 2, and wherein the plurality of release components comprises a file, a package, or a bundle.

Example 4 includes the subject matter of any of Examples 1-3, and wherein to generate the integrity hash tree over the plurality of release components and the release version number comprises to: generate a plurality of leaf hash nodes of the integrity hash tree, wherein each leaf hash node is calculated as a function of a release component or the release version number; and recursively generate a parent hash node as a function of a first hash node and a second hash node.

Example 5 includes the subject matter of any of Examples 1-4, and wherein to generate the integrity hash tree comprises to store a hash node in a metadata field of a release component.

Example 6 includes the subject matter of any of Examples 1-5, and wherein to generate the Lamport one-time signature public-private key pairs comprises to generate the Lamport one-time signature public-private key pairs with a pseudo-random number generator based on a random number seed.

Example 7 includes the subject matter of any of Examples 1-6, and wherein the release authentication module is further to generate the random number seed with a hardware-assisted random number generator of the computing device.

Example 8 includes the subject matter of any of Examples 1-7, and wherein the release authentication module is further to index an entropy multiplexing tree with the release version number to retrieve the random number seed.

Example 9 includes the subject matter of any of Examples 1-8, and wherein the release authentication module is further to transmit the random number seed to a client computing device.

Example 10 includes the subject matter of any of Examples 1-9, and wherein the software update module is further to transmit, to a client computing device, (i) a first release component of the software release and (ii) a first one-time signature that corresponds to a hash node of the integrity hash tree, wherein the hash node corresponds to the first release component.

Example 11 includes the subject matter of any of Examples 1-10, and wherein the software update module is further to transmit, to the client computing device, a first public key and a first authentication path of the authentication tree, wherein the first public key and the first authentication path correspond to the first one-time signature.

Example 12 includes the subject matter of any of Examples 1-11, and wherein the software update module is further to transmit, to the client computing device, the authentication tree and the signature of the root public key.

Example 13 includes the subject matter of any of Examples 1-12, and wherein the software update module is further to transmit the integrity hash tree to the client computing device.

Example 14 includes the subject matter of any of Examples 1-13, and wherein the root authentication module is further to provision a client device with the anchor public key.

Example 15 includes a computing device for secure software update, the computing device comprising: a root authentication module to (i) receive, from an update server, a root public key of a Merkle signature scheme authentication tree associated with a software release and a signature of the root public key, (ii) verify the root public key with the signature of the root public key and an anchor public key that is provisioned to the computing device, and (iii) verify the authentication tree with the root public key in response to verification of the root public key; a software update module to receive, from the update server, a release component of the software release, a hash node of an integrity hash tree that corresponds to the release component, and a Lamport one-time signature corresponding to the hash node of the integrity hash tree; a release integrity module to verify the release component with the hash node of the integrity hash tree; a release authentication module to (i) verify the hash node of the integrity hash tree with the one-time signature, and (ii) verify the one-time signature with the authentication tree in response to verification of the authentication tree; wherein the software update module is further to install the release component in response to verification of the release component, the hash node, and the one-time signature.

Example 16 includes the subject matter of Example 15, and wherein: the root authentication module is further to receive the authentication tree from the update server; and to verify the authentication tree comprises to verify the authentication tree in response to receipt of the authentication tree.

Example 17 includes the subject matter of any of Examples 15 and 16, and wherein: the root authentication module is further to (i) receive a random number seed from the update server, (ii) generate a plurality of Lamport one-time signature public-private key pairs with a pseudo-random number generator based on the random number seed, and (iii) generate the authentication tree based on the plurality of key pairs; and to verify the authentication tree comprises to verify the authentication tree in response to generation of the authentication tree.

Example 18 includes the subject matter of any of Examples 15-17, and wherein: the root authentication module is further to (i) generate an entropy multiplexing tree as a function of a root seed provisioned to the computing device, (ii) index the entropy multiplexing tree with a release version number of the software release to retrieve a random number seed, (iii) generate a plurality of Lamport one-time signature public-private key pairs with a pseudo-random number generator based on the random number seed, and (iv) generate the authentication tree based on the plurality of key pairs; and to verify the authentication tree comprises to verify the authentication tree in response to generation of the authentication tree.

Example 19 includes the subject matter of any of Examples 15-18, and wherein: the software update module is further to receive a release version number of the software release, a second hash node of the integrity hash tree that corresponds to the release version number, and a second Lamport one-time signature that corresponds to the second hash node of the hash tree; the release integrity module is further to verify the release version number with the second hash node of the integrity hash tree; and the release authentication module is further to (i) verify the second hash node of the integrity hash tree with the second one-time signature, and (ii) verify the second one-time signature with the authentication tree.

Example 20 includes the subject matter of any of Examples 15-19, and wherein: the release integrity module is further to receive the integrity hash tree from the update server; and to verify the release component with the hash node of the integrity hash tree comprises to verify the release component in response to receipt of the integrity hash tree from the update server.

Example 21 includes the subject matter of any of Examples 15-20, and wherein to verify the release component comprises to (i) generate a test hash value as a function of the release component and (ii) compare the test hash value and the hash node of the release integrity hash tree.

Example 22 includes the subject matter of any of Examples 15-21, and wherein the software release comprises a hierarchical organization of a plurality of release components that includes the release component.

Example 23 includes the subject matter of any of Examples 15-22, and wherein the release component comprises a file, a package, or a bundle.

Example 24 includes the subject matter of any of Examples 15-23, and wherein the software update module is further to: request, to the update server, a second release component of the software release in response to installation of the release component; and receive, from the update server, the second release component, a second hash node of the integrity hash tree that corresponds to the second release component, and a second Lamport one-time signature corresponding to the second hash node of the integrity hash tree.

Example 25 includes the subject matter of any of Examples 15-24, and further comprising a trusted execution environment, wherein the trusted execution environment comprises the root authentication module, the software update module, the release integrity module, and the release authentication module.

Example 26 includes the subject matter of any of Examples 15-25, and wherein the trusted execution environment comprises a converged security and manageability engine of the computing device.

Example 27 includes a method for secure software update, the method comprising: generating, by a computing device, a software release, wherein the software release comprises a plurality of release components and a release version number; generating, by the computing device, an integrity hash tree over the plurality of release components and the release version number, wherein the integrity hash tree comprises a plurality of hash nodes; generating, by the computing device, a plurality of Lamport one-time signature public-private key pairs, wherein each key pair of the plurality of key pairs corresponds to a hash node of the integrity hash tree; generating, by the computing device, a Merkle signature scheme authentication tree based on the plurality of key pairs; generating, by the computing device, a plurality of one-time signatures, wherein each one-time signature is generated as a function of a hash node of the integrity hash tree and a key pair of the plurality of key pairs corresponding to the hash node; and signing, by the computing device, a root public key of the authentication tree with an anchor private key to generate a signature of the root public key, wherein the anchor private key is paired with an anchor public key.

Example 28 includes the subject matter of Example 27, and wherein generating the software release comprises generating a hierarchical organization of the plurality of release components.

Example 29 includes the subject matter of any of Examples 27 and 28, and wherein the plurality of release components comprises a file, a package, or a bundle.

Example 30 includes the subject matter of any of Examples 27-29, and wherein generating the integrity hash tree over the plurality of release components and the release version number comprises: generating a plurality of leaf hash nodes of the integrity hash tree, wherein each leaf hash node is calculated as a function of a release component or the release version number; and recursively generating a parent hash node as a function of a first hash node and a second hash node.

Example 31 includes the subject matter of any of Examples 27-30, and wherein generating the integrity hash tree comprises storing a hash node in a metadata field of a release component.

Example 32 includes the subject matter of any of Examples 27-31, and wherein generating the Lamport one-time signature public-private key pairs comprises generating the Lamport one-time signature public-private key pairs with a pseudo-random number generator based on a random number seed.

Example 33 includes the subject matter of any of Examples 27-32, and further comprising generating, by the computing device, the random number seed using a hardware-assisted random number generator of the computing device.

Example 34 includes the subject matter of any of Examples 27-33, and further comprising indexing, by the computing device, an entropy multiplexing tree with the release version number to retrieve the random number seed.

Example 35 includes the subject matter of any of Examples 27-34, and further comprising transmitting, by the computing device, the random number seed to a client computing device.

Example 36 includes the subject matter of any of Examples 27-35, and further comprising transmitting, by the computing device to a client computing device, (i) a first release component of the software release and (ii) a first one-time signature that corresponds to a hash node of the integrity hash tree, wherein the hash node corresponds to the first release component.

Example 37 includes the subject matter of any of Examples 27-36, and further comprising transmitting, by the computing device to the client computing device, a first public key and a first authentication path of the authentication tree, wherein the first public key and the first authentication path correspond to the first one-time signature.

Example 38 includes the subject matter of any of Examples 27-37, and further comprising transmitting, by the computing device to the client computing device, the authentication tree and the signature of the root public key.

Example 39 includes the subject matter of any of Examples 27-38, and further comprising transmitting, by the computing device, the integrity hash tree to the client computing device.

Example 40 includes the subject matter of any of Examples 27-39, and further comprising provisioning a client device with the anchor public key.

Example 41 includes a method for secure software update, the method comprising: receiving, by a computing device from an update server, a root public key of a Merkle signature scheme authentication tree associated with a software release and a signature of the root public key; verifying, by the computing device, the root public key with the signature of the root public key and an anchor public key that is provisioned to the computing device; verifying, by the computing device, the authentication tree with the root public key in response to verifying the root public key; receiving, by the computing device from the update server, a release component of the software release, a hash node of an integrity hash tree that corresponds to the release component, and a Lamport one-time signature corresponding to the hash node of the integrity hash tree; verifying, by the computing device, the release component with the hash node of the integrity hash tree; verifying, by the computing device, the hash node of the integrity hash tree with the one-time signature; verifying, by the computing device, the one-time signature with the authentication tree in response to verifying the authentication tree; and installing, by the computing device, the release component in response to verifying the release component, verifying the hash node, and verifying the one-time signature.

Example 42 includes the subject matter of Example 41, and further comprising: receiving, by the computing device, the authentication tree from the update server; wherein verifying the authentication tree comprises verifying the authentication tree in response to receiving the authentication tree.

Example 43 includes the subject matter of any of Examples 41 and 42, and further comprising: receiving, by the computing device, a random number seed from the update server; generating, by the computing device, a plurality of Lamport one-time signature public-private key pairs with a pseudo-random number generator based on the random number seed; and generating, by the computing device, the authentication tree based on the plurality of key pairs; wherein verifying the authentication tree comprises verifying the authentication tree in response to generating the authentication tree.

Example 44 includes the subject matter of any of Examples 41-43, and further comprising: generating, by the computing device, an entropy multiplexing tree as a function of a root seed provisioned to the computing device; indexing, by the computing device, the entropy multiplexing tree with a release version number of the software release to retrieve a random number seed; generating, by the computing device, a plurality of Lamport one-time signature public-private key pairs with a pseudo-random number generator based on the random number seed; and generating, by the computing device, the authentication tree based on the plurality of key pairs; wherein verifying the authentication tree comprises verifying the authentication tree in response generating the authentication tree.

Example 45 includes the subject matter of any of Examples 41-44, and further comprising: receiving, by the computing device, a release version number of the software release, a second hash node of the integrity hash tree that corresponds to the release version number, and a second Lamport one-time signature that corresponds to the second hash node of the hash tree; verifying, by the computing device, the release version number with the second hash node of the integrity hash tree; verifying, by the computing device, the second hash node of the integrity hash tree with the second one-time signature; and verifying, by the computing device, the second one-time signature with the authentication tree.

Example 46 includes the subject matter of any of Examples 41-45, and further comprising: receiving, by the computing device, the integrity hash tree from the update server; wherein verifying the release component with the hash node of the integrity hash tree comprises verifying the release component in response to receiving the integrity hash tree from the update server.

Example 47 includes the subject matter of any of Examples 41-46, and wherein verifying the release component comprises (i) generating a test hash value as a function of the release component and (ii) comparing the test hash value and the hash node of the release integrity hash tree.

Example 48 includes the subject matter of any of Examples 41-47, and wherein the software release comprises a hierarchical organization of a plurality of release components that includes the release component.

Example 49 includes the subject matter of any of Examples 41-48, and wherein the release component comprises a file, a package, or a bundle.

Example 50 includes the subject matter of any of Examples 41-49, and further comprising: requesting, by the computing device to the update server, a second release component of the software release in response to installing the release component; and receiving, by the computing device from the update server, the second release component, a second hash node of the integrity hash tree that corresponds to the second release component, and a second Lamport one-time signature corresponding to the second hash node of the integrity hash tree.

Example 51 includes the subject matter of any of Examples 41-50, and wherein: receiving the root public key and the signature of the root public key comprises receiving the root public key and the signature of the root public key by a trusted execution environment of the computing device; verifying the root public key comprises verifying the root public key by the trusted execution environment; verifying the authentication tree comprises verifying the authentication tree by the trusted execution environment; receiving the release component, the hash node, and the signature corresponding to the hash node comprises receiving the release component, the hash node, and the one-time signature corresponding to the hash node by the trusted execution environment; verifying the release component comprises verifying the release component by the trusted execution environment; verifying the hash node comprises verifying the hash node by the trusted execution environment; and verifying the one-time signature comprises verifying the one-time signature by the trusted execution environment.

Example 52 includes the subject matter of any of Examples 41-51, and wherein the trusted execution environment comprises a converged security and manageability engine of the computing device.

Example 53 includes a computing device comprising: a processor; and a memory having stored therein a plurality of instructions that when executed by the processor cause the computing device to perform the method of any of Examples 27-52.

Example 54 includes one or more machine readable storage media comprising a plurality of instructions stored thereon that in response to being executed result in a computing device performing the method of any of Examples 27-52.

Example 55 includes a computing device comprising means for performing the method of any of Examples 27-52.

Example 56 includes a computing device for secure software update, the computing device comprising: means for generating a software release, wherein the software release comprises a plurality of release components and a release version number; means for generating an integrity hash tree over the plurality of release components and the release version number, wherein the integrity hash tree comprises a plurality of hash nodes; means for generating a plurality of Lamport one-time signature public-private key pairs, wherein each key pair of the plurality of key pairs corresponds to a hash node of the integrity hash tree; means for generating a Merkle signature scheme authentication tree based on the plurality of key pairs; means for generating a plurality of one-time signatures, wherein each one-time signature is generated as a function of a hash node of the integrity hash tree and a key pair of the plurality of key pairs corresponding to the hash node; and means for signing a root public key of the authentication tree with an anchor private key to generate a signature of the root public key, wherein the anchor private key is paired with an anchor public key.

Example 57 includes the subject matter of Example 56, and wherein the means for generating the software release comprises means for generating a hierarchical organization of the plurality of release components.

Example 58 includes the subject matter of any of Examples 56 and 57, and wherein the plurality of release components comprises a file, a package, or a bundle.

Example 59 includes the subject matter of any of Examples 56-58, and wherein the means for generating the integrity hash tree over the plurality of release components and the release version number comprises: means for generating a plurality of leaf hash nodes of the integrity hash tree, wherein each leaf hash node is calculated as a function of a release component or the release version number; and means for recursively generating a parent hash node as a function of a first hash node and a second hash node.

Example 60 includes the subject matter of any of Examples 56-59, and wherein the means for generating the integrity hash tree comprises means for storing a hash node in a metadata field of a release component.

Example 61 includes the subject matter of any of Examples 56-60, and wherein the means for generating the Lamport one-time signature public-private key pairs comprises means for generating the Lamport one-time signature public-private key pairs with a pseudo-random number generator based on a random number seed.

Example 62 includes the subject matter of any of Examples 56-61, and further comprising means for generating the random number seed using a hardware-assisted random number generator of the computing device.

Example 63 includes the subject matter of any of Examples 56-62, and further comprising means for indexing an entropy multiplexing tree with the release version number to retrieve the random number seed.

Example 64 includes the subject matter of any of Examples 56-63, and further comprising means for transmitting the random number seed to a client computing device.

Example 65 includes the subject matter of any of Examples 56-64, and further comprising means for transmitting, by the computing device to a client computing device, (i) a first release component of the software release and (ii) a first one-time signature that corresponds to a hash node of the integrity hash tree, wherein the hash node corresponds to the first release component.

Example 66 includes the subject matter of any of Examples 56-65, and further comprising means for transmitting, by the computing device to the client computing device, a first public key and a first authentication path of the authentication tree, wherein the first public key and the first authentication path correspond to the first one-time signature.

Example 67 includes the subject matter of any of Examples 56-66, and further comprising means for transmitting, by the computing device to the client computing device, the authentication tree and the signature of the root public key.

Example 68 includes the subject matter of any of Examples 56-67, and further comprising means for transmitting the integrity hash tree to the client computing device.

Example 69 includes the subject matter of any of Examples 56-68, and further comprising means for provisioning a client device with the anchor public key.

Example 70 includes a computing device for secure software update, the computing device comprising: means for receiving, from an update server, a root public key of a Merkle signature scheme authentication tree associated with a software release and a signature of the root public key; means for verifying the root public key with the signature of the root public key and an anchor public key that is provisioned to the computing device; means for verifying the authentication tree with the root public key in response to verifying the root public key; means for receiving, by the computing device from the update server, a release component of the software release, a hash node of an integrity hash tree that corresponds to the release component, and a Lamport one-time signature corresponding to the hash node of the integrity hash tree; means for verifying the release component with the hash node of the integrity hash tree; means for verifying the hash node of the integrity hash tree with the one-time signature; means for verifying the one-time signature with the authentication tree in response to verifying the authentication tree; and means for installing the release component in response to verifying the release component, verifying the hash node, and verifying the one-time signature.

Example 71 includes the subject matter of Example 70, and further comprising: means for receiving the authentication tree from the update server; wherein the means for verifying the authentication tree comprises means for verifying the authentication tree in response to receiving the authentication tree.

Example 72 includes the subject matter of any of Examples 70 and 71, and further comprising: means for receiving a random number seed from the update server; means for generating a plurality of Lamport one-time signature public-private key pairs with a pseudo-random number generator based on the random number seed; and means for generating the authentication tree based on the plurality of key pairs; wherein the means for verifying the authentication tree comprises means for verifying the authentication tree in response to generating the authentication tree.

Example 73 includes the subject matter of any of Examples 70-72, and further comprising: means for generating an entropy multiplexing tree as a function of a root seed provisioned to the computing device; means for indexing the entropy multiplexing tree with a release version number of the software release to retrieve a random number seed; means for generating a plurality of Lamport one-time signature public-private key pairs with a pseudo-random number generator based on the random number seed; and means for generating the authentication tree based on the plurality of key pairs; wherein the means for verifying the authentication tree comprises means for verifying the authentication tree in response generating the authentication tree.

Example 74 includes the subject matter of any of Examples 70-73, and further comprising: means for receiving a release version number of the software release, a second hash node of the integrity hash tree that corresponds to the release version number, and a second Lamport one-time signature that corresponds to the second hash node of the hash tree; means for verifying the release version number with the second hash node of the integrity hash tree; means for verifying the second hash node of the integrity hash tree with the second one-time signature; and means for verifying the second one-time signature with the authentication tree.

Example 75 includes the subject matter of any of Examples 70-74, and further comprising: means for receiving the integrity hash tree from the update server; wherein the means for verifying the release component with the hash node of the integrity hash tree comprises means for verifying the release component in response to receiving the integrity hash tree from the update server.

Example 76 includes the subject matter of any of Examples 70-75, and wherein the means for verifying the release component comprises (i) means for generating a test hash value as a function of the release component and (ii) means for comparing the test hash value and the hash node of the release integrity hash tree.

Example 77 includes the subject matter of any of Examples 70-76, and wherein the software release comprises a hierarchical organization of a plurality of release components that includes the release component.

Example 78 includes the subject matter of any of Examples 70-77, and wherein the release component comprises a file, a package, or a bundle.

Example 79 includes the subject matter of any of Examples 70-78, and further comprising: means for requesting, by the computing device to the update server, a second release component of the software release in response to installing the release component; and means for receiving, by the computing device from the update server, the second release component, a second hash node of the integrity hash tree that corresponds to the second release component, and a second Lamport one-time signature corresponding to the second hash node of the integrity hash tree.

Example 80 includes the subject matter of any of Examples 70-79, and wherein: the means for receiving the root public key and the signature of the root public key comprises means for receiving the root public key and the signature of the root public key by a trusted execution environment of the computing device; the means for verifying the root public key comprises means for verifying the root public key by the trusted execution environment; the means for verifying the authentication tree comprises means for verifying the authentication tree by the trusted execution environment; the means for receiving the release component, the hash node, and the signature corresponding to the hash node comprises means for receiving the release component, the hash node, and the one-time signature corresponding to the hash node by the trusted execution environment; the means for verifying the release component comprises means for verifying the release component by the trusted execution environment; the means for verifying the hash node comprises means for verifying the hash node by the trusted execution environment; and the means for verifying the one-time signature comprises means for verifying the one-time signature by the trusted execution environment.

Example 81 includes the subject matter of any of Examples 70-80, and wherein the trusted execution environment comprises a converged security and manageability engine of the computing device.

The invention claimed is:

1. A computing device for secure software update, the computing device comprising:
a software update module to generate a software release, wherein the software release comprises a plurality of release components and a release version number;
a release integrity module to generate an integrity hash tree over the plurality of release components and the release version number, wherein the integrity hash tree comprises a plurality of hash nodes;
a release authentication module to (i) generate a plurality of Lamport one-time signature public-private key pairs, wherein each key pair of the plurality of key pairs corresponds to a hash node of the integrity hash tree, (ii) generate a Merkle signature scheme authentication tree based on the plurality of key pairs, and (iii) generate a plurality of one-time signatures, wherein each one-time signature is generated as a function of a respective hash node of the integrity hash tree and a key pair of the plurality of key pairs corresponding to the respective hash node; and
a root authentication module to sign a root public key of the authentication tree with an anchor private key to generate a signature of the root public key, wherein the anchor private key is paired with an anchor public key.

2. The computing device of claim 1, wherein to generate the software release comprises to generate a hierarchical organization of the plurality of release components.

3. The computing device of claim 1, wherein the plurality of release components comprises a file, a package, or a bundle.

4. The computing device of claim 1, wherein to generate the integrity hash tree over the plurality of release components and the release version number comprises to:
generate a plurality of leaf hash nodes of the integrity hash tree, wherein each leaf hash node is calculated as a function of a release component or the release version number; and
recursively generate a parent hash node as a function of a first hash node and a second hash node.

5. The computing device of claim 1, wherein to generate the Lamport one-time signature public-private key pairs comprises to generate the Lamport one-time signature public-private key pairs with a pseudo-random number generator based on a random number seed.

6. The computing device of claim 5, wherein the release authentication module is further to generate the random number seed with a hardware-assisted random number generator of the computing device.

7. The computing device of claim 5, wherein the release authentication module is further to index an entropy multiplexing tree with the release version number to retrieve the random number seed.

8. One or more non-transitory, computer-readable storage media comprising a plurality of instructions that in response to being executed cause a computing device to:
generate a software release, wherein the software release comprises a plurality of release components and a release version number;
generate an integrity hash tree over the plurality of release components and the release version number, wherein the integrity hash tree comprises a plurality of hash nodes;
generate a plurality of Lamport one-time signature public-private key pairs, wherein each key pair of the plurality of key pairs corresponds to a hash node of the integrity hash tree;
generate a Merkle signature scheme authentication tree based on the plurality of key pairs;
generate a plurality of one-time signatures, wherein each one-time signature is generated as a function of a respective hash node of the integrity hash tree and a key pair of the plurality of key pairs corresponding to the respective hash node; and
sign a root public key of the authentication tree with an anchor private key to generate a signature of the root public key, wherein the anchor private key is paired with an anchor public key.

9. The one or more non-transitory, computer-readable storage media of claim 8, wherein to generate the software release comprises to generate a hierarchical organization of the plurality of release components.

10. The one or more non-transitory, computer-readable storage media of claim 8, wherein to generate the Lamport one-time signature public-private key pairs comprises to generate the Lamport one-time signature public-private key pairs with a pseudo-random number generator based on a random number seed.

11. The one or more non-transitory, computer-readable storage media of claim 10, further comprising a plurality of instructions that in response to being executed cause the computing device to generate the random number seed using a hardware-assisted random number generator of the computing device.

12. The one or more non-transitory, computer-readable storage media of claim 10, further comprising a plurality of instructions that in response to being executed cause the computing device to index an entropy multiplexing tree with the release version number to retrieve the random number seed.

13. A computing device for secure software update, the computing device comprising:
a root authentication module to (i) receive, from an update server, a root public key of a Merkle signature scheme authentication tree associated with a software release and a signature of the root public key, (ii) verify the root public key with the signature of the root public key and an anchor public key that is provisioned to the computing device, and (iii) verify the authentication tree with the root public key in response to verification of the root public key;
a software update module to receive, from the update server, a release component of the software release, a hash node of an integrity hash tree that corresponds to the release component, and a Lamport one-time signature corresponding to the hash node of the integrity hash tree;
a release integrity module to verify the release component with the hash node of the integrity hash tree;
a release authentication module to (i) verify the hash node of the integrity hash tree with the one-time signature, and (ii) verify the one-time signature with the authentication tree in response to verification of the authentication tree;
wherein the software update module is further to install the release component in response to verification of the release component, the hash node, and the one-time signature.

14. The computing device of claim 13, wherein:
the root authentication module is further to receive the authentication tree from the update server; and
to verify the authentication tree comprises to verify the authentication tree in response to receipt of the authentication tree.

15. The computing device of claim 13, wherein:
the root authentication module is further to (i) receive a random number seed from the update server, (ii) generate a plurality of Lamport one-time signature public-private key pairs with a pseudo-random number generator based on the random number seed, and (iii) generate the authentication tree based on the plurality of key pairs; and
to verify the authentication tree comprises to verify the authentication tree in response to generation of the authentication tree.

16. The computing device of claim 13, wherein:
the root authentication module is further to (i) generate an entropy multiplexing tree as a function of a root seed provisioned to the computing device, (ii) index the entropy multiplexing tree with a release version number of the software release to retrieve a random number seed, (iii) generate a plurality of Lamport one-time signature public-private key pairs with a pseudo-random number generator based on the random number seed, and (iv) generate the authentication tree based on the plurality of key pairs; and
to verify the authentication tree comprises to verify the authentication tree in response to generation of the authentication tree.

17. The computing device of claim 13, wherein:
the release integrity module is further to receive the integrity hash tree from the update server; and
to verify the release component with the hash node of the integrity hash tree comprises to verify the release component in response to receipt of the integrity hash tree from the update server.

18. The computing device of claim 13, further comprising a trusted execution environment, wherein the trusted execution environment comprises the root authentication module, the software update module, the release integrity module, and the release authentication module.

19. The computing device of claim 18, wherein the trusted execution environment comprises a converged security and manageability engine of the computing device.

20. One or more non-transitory, computer-readable storage media comprising a plurality of instructions that in response to being executed cause a computing device to:
receive, from an update server, a root public key of a Merkle signature scheme authentication tree associated with a software release and a signature of the root public key;
verify the root public key with the signature of the root public key and an anchor public key that is provisioned to the computing device;
verify the authentication tree with the root public key in response to verifying the root public key;
receive, from the update server, a release component of the software release, a hash node of an integrity hash tree that corresponds to the release component, and a Lamport one-time signature corresponding to the hash node of the integrity hash tree;
verify the release component with the hash node of the integrity hash tree;
verify the hash node of the integrity hash tree with the one-time signature;
verify the one-time signature with the authentication tree in response to verifying the authentication tree; and
install the release component in response to verifying the release component, verifying the hash node, and verifying the one-time signature.

21. The one or more non-transitory, computer-readable storage media of claim 20, further comprising a plurality of instructions that in response to being executed cause the computing device to:
receive the authentication tree from the update server;
wherein to verify the authentication tree comprises to verify the authentication tree in response to receiving the authentication tree.

22. The one or more non-transitory, computer-readable storage media of claim 20, further comprising a plurality of instructions that in response to being executed cause the computing device to:
receive a random number seed from the update server;
generate a plurality of Lamport one-time signature public-private key pairs with a pseudo-random number generator based on the random number seed; and
generate the authentication tree based on the plurality of key pairs;
wherein to verify the authentication tree comprises to verify the authentication tree in response to generating the authentication tree.

23. The one or more non-transitory, computer-readable storage media of claim 20, further comprising a plurality of instructions that in response to being executed cause the computing device to:

generate an entropy multiplexing tree as a function of a root seed provisioned to the computing device;

index the entropy multiplexing tree with a release version number of the software release to retrieve a random number seed;

generate a plurality of Lamport one-time signature public-private key pairs with a pseudo-random number generator based on the random number seed; and generate the authentication tree based on the plurality of key pairs;

wherein to verify the authentication tree comprises to verify the authentication tree in response generating the authentication tree.

24. The one or more non-transitory, computer-readable storage media of claim 20, wherein:

to receive the root public key and the signature of the root public key comprises to receive the root public key and the signature of the root public key by a trusted execution environment of the computing device;

to verify the root public key comprises to verify the root public key by the trusted execution environment;

to verify the authentication tree comprises to verify the authentication tree by the trusted execution environment;

to receive the release component, the hash node, and the signature corresponding to the hash node comprises to receive the release component, the hash node, and the one-time signature corresponding to the hash node by the trusted execution environment;

to verify the release component comprises to verify the release component by the trusted execution environment;

to verify the hash node comprises to verify the hash node by the trusted execution environment; and to verify the one-time signature comprises to verify the one-time signature by the trusted execution environment.

25. The one or more non-transitory, computer-readable storage media of claim 24, wherein the trusted execution environment comprises a converged security and manageability engine of the computing device.

* * * * *